United States Patent

Marcoiu

(10) Patent No.: US 9,541,770 B2
(45) Date of Patent: Jan. 10, 2017

(54) HINGE WITH CIRCULAR CAM EYELETS, FOR THE ELASTIC ARTICULATED JOINING OF THE TEMPLES TO THE FRONT OF AN EYEGLASS FRAME

(71) Applicant: LUXOTTICA S.R.L., Agordo (IT)

(72) Inventor: Minhea Cezar Marcoiu, Belluno (IT)

(73) Assignee: LUXOTTICA S.R.L., Agordo (IT)

( * ) Notice: Subject to any disclaimer, the term of this patent is extended or adjusted under 35 U.S.C. 154(b) by 0 days.

(21) Appl. No.: 14/890,083

(22) PCT Filed: May 9, 2014

(86) PCT No.: PCT/EP2014/059531
§ 371 (c)(1),
(2) Date: Nov. 9, 2015

(87) PCT Pub. No.: WO2014/180976
PCT Pub. Date: Nov. 13, 2014

(65) Prior Publication Data
US 2016/0124244 A1 May 5, 2016

(30) Foreign Application Priority Data

May 9, 2013 (IT) .............................. BL2013A0008

(51) Int. Cl.
*G02C 5/22* (2006.01)
*G02C 1/08* (2006.01)
(Continued)

(52) U.S. Cl.
CPC .............. *G02C 5/2254* (2013.01); *G02C 1/08* (2013.01); *G02C 5/10* (2013.01); *G02C 5/146* (2013.01);
(Continued)

(58) Field of Classification Search
CPC ....... G02C 5/22; G02C 5/2209; G02C 5/2254; G02C 5/146; G02C 2200/04; G02C 2200/06; G02C 2200/18; G02C 2200/20
(Continued)

(56) References Cited

U.S. PATENT DOCUMENTS 5,975,693 A * 11/1999 Malfroy ................. G02C 5/008
16/228
2006/0213031 A1 9/2006 Niu
(Continued)

FOREIGN PATENT DOCUMENTS

DE 102004054841 A1 12/2005
DE 102005034885 A1 2/2007
(Continued)

OTHER PUBLICATIONS

International Search Report and Written Opinion issued Jul. 4, 2014 re: Application No. PCT/EP2014/059531; pp. 1-8; citing: US 2011/080556 A1, US 2006/213031 A1, EP 1 722 264 A1 and WO 2010/007692 A1.

*Primary Examiner* — Huy K Mai
(74) *Attorney, Agent, or Firm* — Cantor Colburn LLP

(57) ABSTRACT

A hinge for the articulated joining of eyeglass frame temples to their respective end pieces of the front of the frame, without requiring welding of eyelets or of other joining parts to the end pieces of the front and temple. The hinge is constituted by a pair of independent outer eyelets engaged with two tines provided at the hingeing end of the temple, and by a middle eyelet (10) engaged with two tines provided at the two side hingeing end pieces of the front of the eyeglass frame. The middle eyelet includes two coaxial cavities with contoured bottom surfaces that define circular or radial cams, these surfaces rotating and sliding on corresponding and mutually opposed radial cam surfaces of the
(Continued)

outer eyelets which, with the rotation of the temples with which they are associated, cause an axial translational movement of those outer eyelets.

11 Claims, 6 Drawing Sheets

(51) Int. Cl.
    *G02C 5/10*     (2006.01)
    *G02C 5/14*     (2006.01)

(52) U.S. Cl.
    CPC ......... *G02C 5/2209* (2013.01); *G02C 2200/04* (2013.01); *G02C 2200/06* (2013.01); *G02C 2200/12* (2013.01)

(58) Field of Classification Search
    USPC ............................................. 351/153; 16/228
    See application file for complete search history.

(56) References Cited

U.S. PATENT DOCUMENTS

| | | |
|---|---|---|
| 2007/0121060 A1 | 5/2007 | Habermann |
| 2011/0080556 A1 | 4/2011 | Yee et al. |

FOREIGN PATENT DOCUMENTS

| | | |
|---|---|---|
| EP | 0096928 A1 | 12/1983 |
| EP | 0262099 A2 | 3/1988 |
| EP | 0395939 A2 | 11/1990 |
| EP | 1722264 A1 | 11/2006 |
| IT | 1307972 B1 | 11/2001 |
| WO | 2004040355 A1 | 5/2004 |
| WO | 2010007692 A1 | 1/2010 |

\* cited by examiner

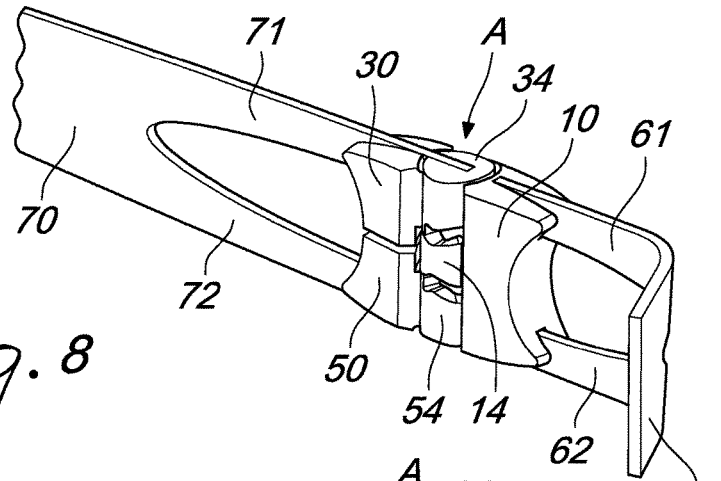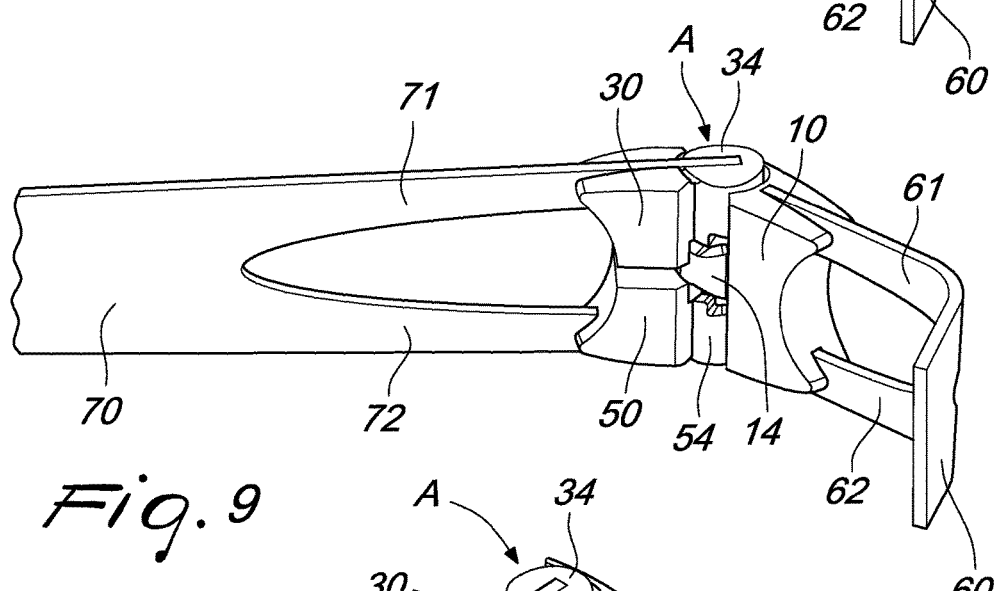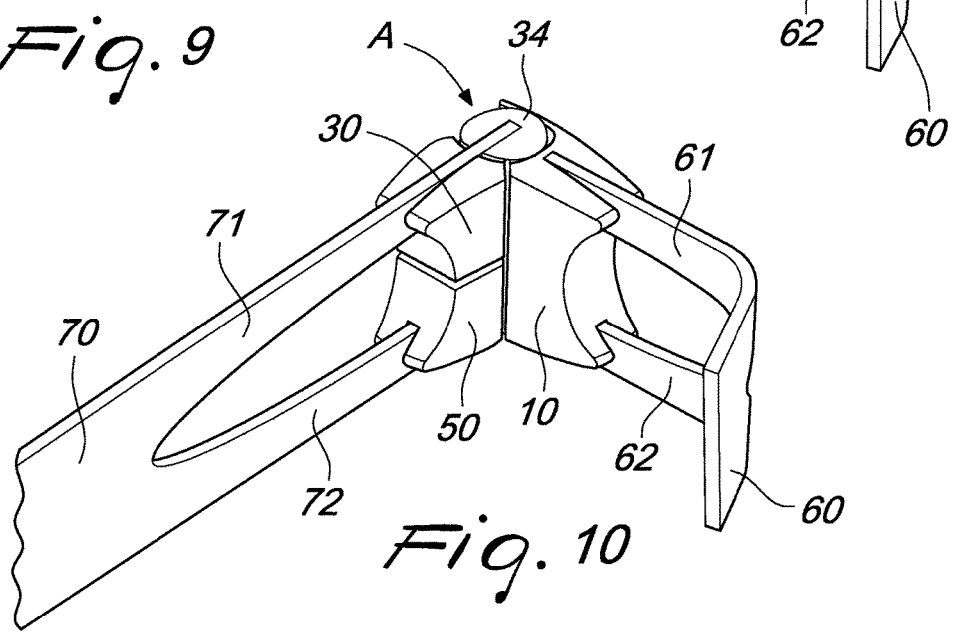

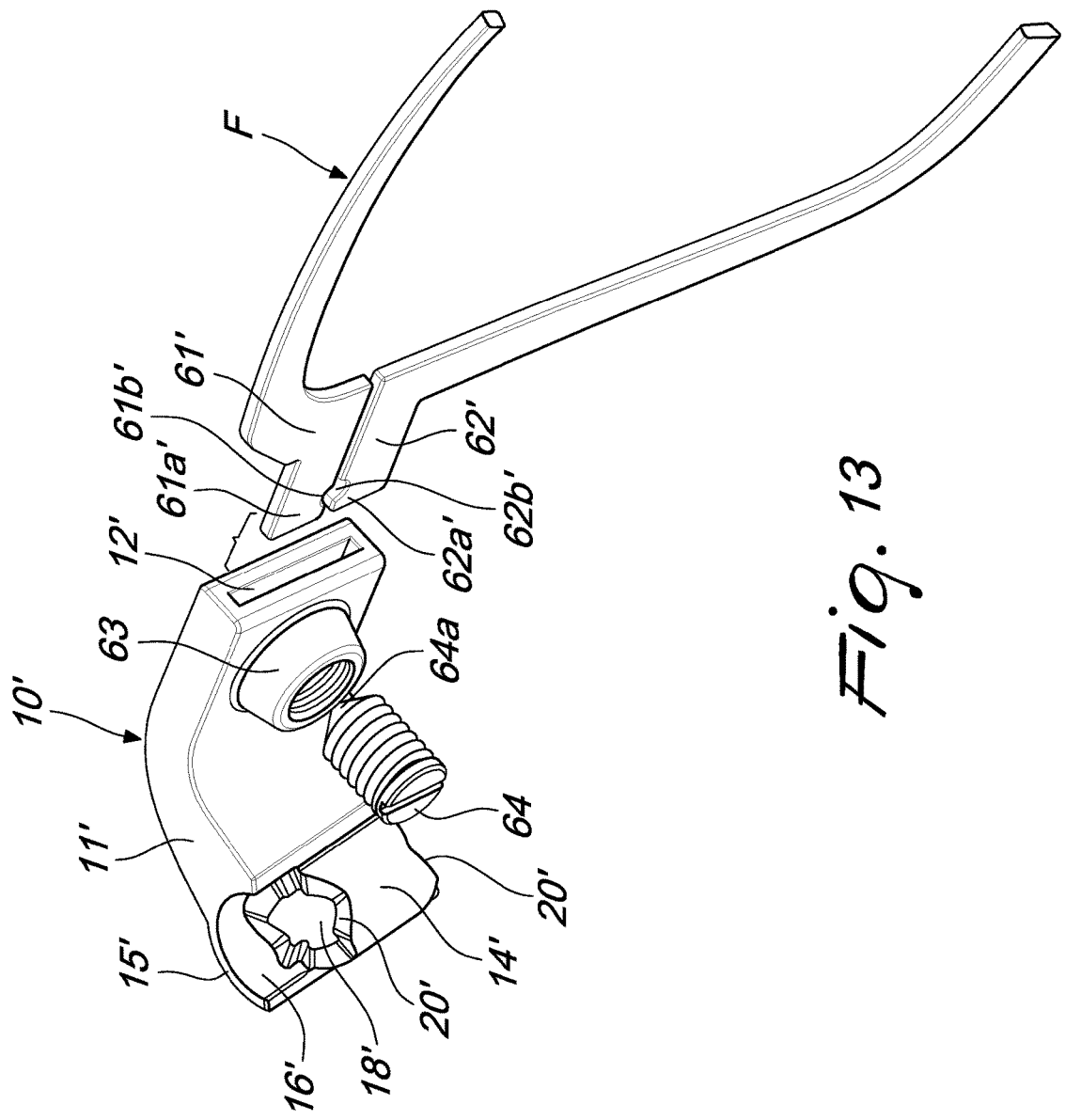

HINGE WITH CIRCULAR CAM EYELETS, FOR THE ELASTIC ARTICULATED JOINING OF THE TEMPLES TO THE FRONT OF AN EYEGLASS FRAME

FIELD

The present disclosure relates to a new construction form of hinge, for the articulated joining of the temples to the respective end pieces of the front of an eyeglass frame, for the provision of which no welding is required of eyelets or of other joining parts to the respective end pieces of the front and of the temple, and no insertion is required of articulation screws or pins.

BACKGROUND

In the conventional technique of providing eyeglasses, the joining and articulation of the temples to the end pieces of the front of the eyeglass frame for supporting the lenses is done by way of alignment of the eyelets provided at the ends of the temples with the eyelets provided at the ends of the front, so as to be able to insert a pin or a screw therein which thus joins the ends in a stable and articulated manner, thus allowing the opening and closing of the temples of the eyeglasses to be worn.

With respect to this conventional solution, the introduction of elasticized hinges, the function of which is to render the use of the eyeglasses more comfortable, while also providing for innumerable construction variations of greater or lesser complexity of the hinge elements for the temples and end pieces of the front or lug of eyeglasses, are all substantially based on the presence of an elastic means, generally acting by traction, with a screw or pin for hingeing the respective eyelets, for example according to the following patents: no. EP0096928 of 1983 in the name of COMET; no. EP0262099 of 1987 in the name of SAFILO; no. EP0395939 of 1990 in the name of OBE WERK; no. EP1556729 of 2003 in the name of IRIDE.

A more recent technique offers the possibility of obtaining a similar elasticity of the temple, by fitting its hingeing end with a flexible plate or end, which can be placed in abutment against a squared abutment that is integral with the end piece of the front of an eyeglass frame, for example according to patent no. IT 1,307,972 of 1999 in the name of Tabacchi, or according to utility model no. DE10 200454841 of 2004 in the name of Frost Paris, or according to utility model no. DE 10 2005034885 of 2005 in the name of Ic! Berlin, and also patent application no. US 2007/0121060 of 2006 in the name of Habermann. In these patents, a part of the temple end is forcibly brought into contact with a squared end of the front of the eyeglass frame, and it can slip along two surfaces of that end which are indicatively mutually perpendicular, thus causing a click that tends to preferably put that temple in the closed and open positions, even in the event that it is splayed open beyond the normal extent.

However, in their practical implementation, even these solutions have been found to be rather impractical and not straightforward to carry out, as well as being complex at assembly time, with frequent problems of wear of the chrome-plated part of the frame and of deficiencies in retaining the lenses. Furthermore, the various solutions known up to now always involve the application of at least one hingeing screw or pin, as well as the usual soldering of the eyelets and the mechanical application of the elastic means, in order to provide the opening and closing click, and these are always provided in seats that are small and inconvenient, which weaken the structure of the eyeglass frame and make it possible to use elastic means of low force that lose their force over time.

SUMMARY

The principal characteristic of the present disclosure is that it involves providing a hinge that is constituted by a pair of two independent outer eyelets, to be engaged with two tines provided at the hingeing end of the temple, and by a middle eyelet, to be engaged with two tines provided at the two side hingeing end pieces of the front of the eyeglass frame, the middle eyelet being provided with two coaxial cavities with contoured bottom surfaces that define circular or radial cams, these surfaces being able to rotate and slide on corresponding and mutually opposite radial cam surfaces of the outer eyelets which, with the rotation of the temples with which they are associated, cause an axial translational movement of those outer eyelets, this translational movement being opposed elastically by the tines of the hingeing ends of the temples, thus determining the opening and closing click of the temples on the front of the eyeglass frame.

The aim of the present disclosure is to provide and assemble an eyeglass frame that is free from screws or pins for hingeing the end pieces of the front with the respective temple, and thus from all current problems associated with the stable fixing of the hinged parts.

Within this aim, an object of the present disclosure is to provide the desired elasticity that enables the click of the temples when they are closed and opened on the front part of the eyeglasses frame, but without the application and interposition of elastic means of traction, compression or bending in cramped spaces of the ends of the temples and of the front, thus also overcoming the problems of weakness and limited lifetime of such elastic means.

Another object of the present disclosure is to provide an eyeglass frame that is free from all soldering, in particular of the eyelets for hingeing to the respective ends of the temples and of the front, thus overcoming all problems of breakage owing to the scant robustness of the join between the eyelets and to the material of the ends of the temples and of the front, which is unsuitable for welding.

Another object of the present disclosure is to provide an eyeglass frame that has no moving parts that are adapted to damage the chrome plating or surface finish appearance of the ends of the temples and/or of the front.

This aim and these and other objects the will become better apparent hereinafter are fully achieved with the present disclosure which, involves providing a hinge that is constituted by a pair of independent outer eyelets, to be engaged with two tines of the end of a temple, and by a middle eyelet, to be engaged with two tines of the end piece of the front, said middle eyelet being provided with two coaxial cavities with contoured bottom surfaces that define circular or radial cams, said surfaces being able to rotate and slide radially on corresponding and mutually opposite radial cam surfaces of the outer eyelets which, with the rotation of the temples with which they are associated, cause an axial translational movement thereof, said translational movement being acted against elastically by the tines of the ends of the temples, thus determining the opening and closing click of said temples of the eyeglass frame.

BRIEF DESCRIPTION OF THE DRAWINGS

FIG. 8 is a view of a hinge similar to the view in FIG. 7, from a different perspective;

FIG. 9 is a perspective view of the hinge similar to the view in FIG. 8, showing the temple being rotated on its hingeing front;

FIG. 10 is a perspective view of the hinge similar to the views in FIGS. 8 and 9, showing the temple in the closed position, with respect to the hingeing front;

FIG. 13 is a perspective view of a front of an eyeglass frame which, in accordance with a first variation of embodiment, has a different shape structure of the middle eyelet or element of the hinge in question.

In all the figures the same details are designated, or are understood to be designated, with the same reference numeral.

DETAILED DESCRIPTION OF THE DRAWINGS

Figure 1:
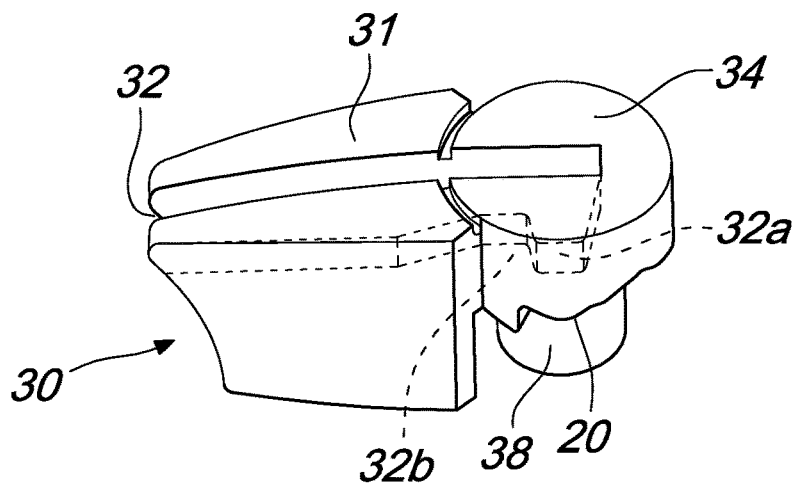
FIG. 1 is a perspective view of an independent outer eyelet that can be applied to the upper part of the center eyelet in FIG. 2.

With reference to the figures, a central block of a hinge A, for the articulated joining of a temple 70 to a front 60 of an eyeglass frame, is constituted by a middle eyelet 10, which can be associated with an end piece of a front or with a lug 60, and by a pair of independent outer eyelets 30 and 50, which are associable with the middle eyelet 10 and with the hingeing end of a temple 70 of an eyeglass frame.

Figure 2:
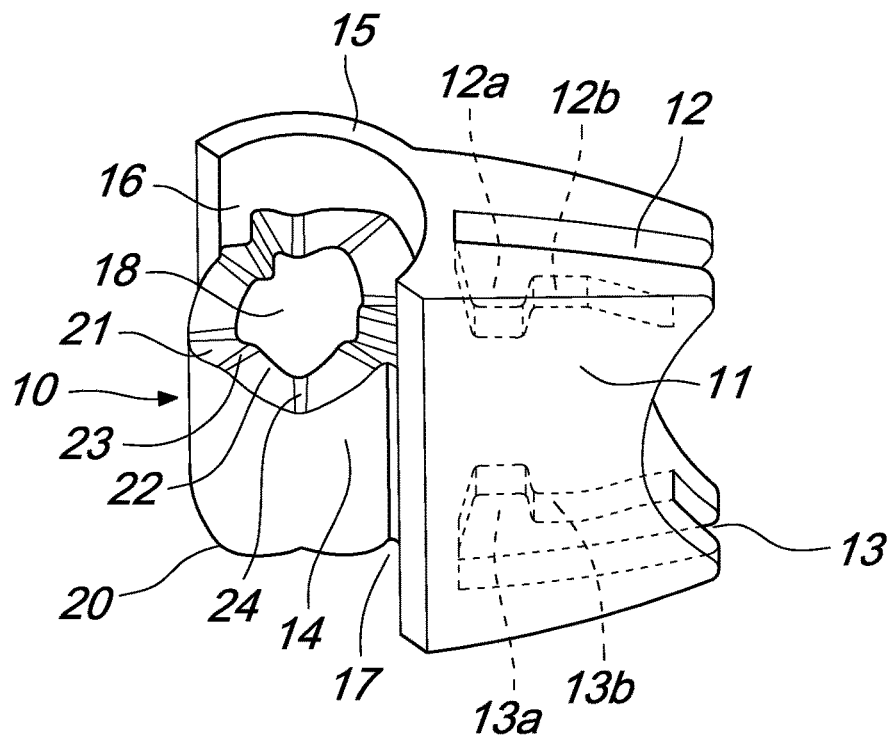
FIG. 2 is a perspective view of a center or middle eyelet, which can be applied to the lug or end piece of the front in order to be interposed between the upper eyelet in FIG. 1 and the lower eyelet in FIG. 3.

In more detail and with particular reference to FIG. 2, a middle eyelet 10 has a side body 11 that is provided with an upper slit 12 thereof and a corresponding lower slit 13, both of which are provided with a respective end cavity 12a and 13a and with a respective adjacent abutment 12b, 13b.

The side body 11 is connected with a cylindrical middle part 14 that is integral with a curved wall 15, such wall 15 being adapted to define two mutually opposite open cavities 16 and 17 that are mutually connected by an axial hole 18.

The cavities 16 and 17 have an opposing axial end face or rim of the cylinder 14 which is contoured to define a radial or spatial cam 20, with inclined radial surfaces 21 and 22 that are adapted to determine at least one crest 23 and at least one trough 24, for each one of the two mutually opposite cams 20, the function of which is better described hereinbelow.

With reference to FIG. 1, an independent eyelet 30, to be associated with the end of a temple 70, is constituted by a side body 31 and by a cylindrical body 34, along which is defined a slit 32 with a head cavity 32a and with an adjacent abutment 32b, while the cylindrical body 34 has a cylindrical coaxial shank 38, arranged on the side thereof that is lower and opposite to the slit 32.

The lower part of the cylindrical body 34 has a radial or spatial cam 20 shape structure that corresponds to the cam 20 of the center eyelet 10 and has similar inclinations 21, 22, with crests 23 and with troughs 24. Obviously the diameter of the cylindrical body 34 and of its shank 38 correspond to the inside diameter of the curve 15 and of the hole 18, in order to be capable of being accommodated in the space 16 and in the hole 18 of the eyelet 10.

It is evident that, by rotating the eyelet 30 after it is accommodated in the space 16 of the middle eyelet 10, there will be a sliding of the inclined walls 21, 22 of their cam surfaces 20, thus forcing the eyelet 30 to lift up and drop down, in order to move the respective crest and trough positions 23, 24 to a new angular position that, advantageously, is rotated 90° with respect to the previous position.

Figure 3:
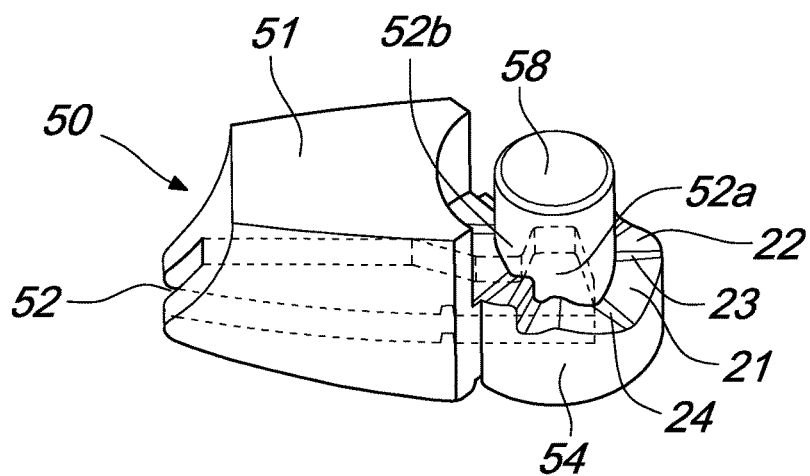
FIG. 3 is a perspective view of an independent outer eyelet that can be applied to the lower part of the center eyelet in FIG. 2.

With particular reference to FIG. 3, the lower outer eyelet 50 is also constituted by a side body 51 and by a cylindrical central body 54, between which is defined a slit 52 with a head cavity 52a, and with an adjacent abutment 52b, while the cylindrical body 54 is provided with a coaxial shank 58 that is arranged on the side thereof that is upper and opposite to the slit 52.

The upper part of the cylindrical body 54 has a radial cam 20 shape structure, with inclined walls 21, 22, with crests 23 and with troughs 24, according to what is described above for the center ring 10. The body 54 can be accommodated in the space 17 while its cylindrical shank 58 can be accommodated in the cylindrical space 18 of the middle eyelet 10 and consequently, by rotating the eyelet 50 on the center eyelet 10, an axial translational movement thereof is produced, which is corresponding and contrary to that described previously for a corresponding rotation of the upper eyelet 30.

Figure 4:
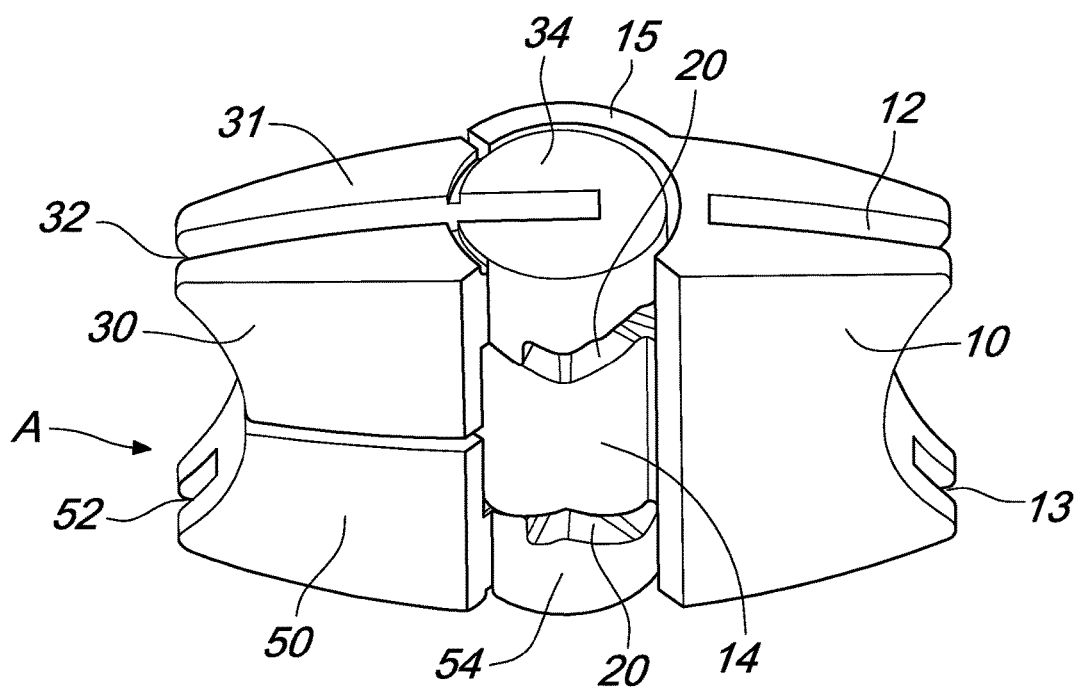
FIG. 4 is a perspective view of the eyelets in FIGS. 1, 2 and 3, assembled together in order to constitute the central part of the hinge in question.

The arrangement of the crests 23 and troughs 24 of the various cams 20, applied to the cavities 16, 17 of the eyelet 10 and to the internal end faces of the cylindrical bodies 34 and 54 of the outer eyelets 30, 50, is naturally such that the interlocking of the outer eyelets 30, 50 with the middle eyelet 10 determines the formation of a central hinge block A that can arrange them in an aligned position, as shown for the purposes of example in FIG. 4, or in a perpendicular position, as shown for the purposes of example in FIG. 10, and also in an intermediate position, shown for the purposes of example in FIG. 9, such position being precarious, in view of the opening or closing click of the temple 70 that is associated with it.

Figure 5:
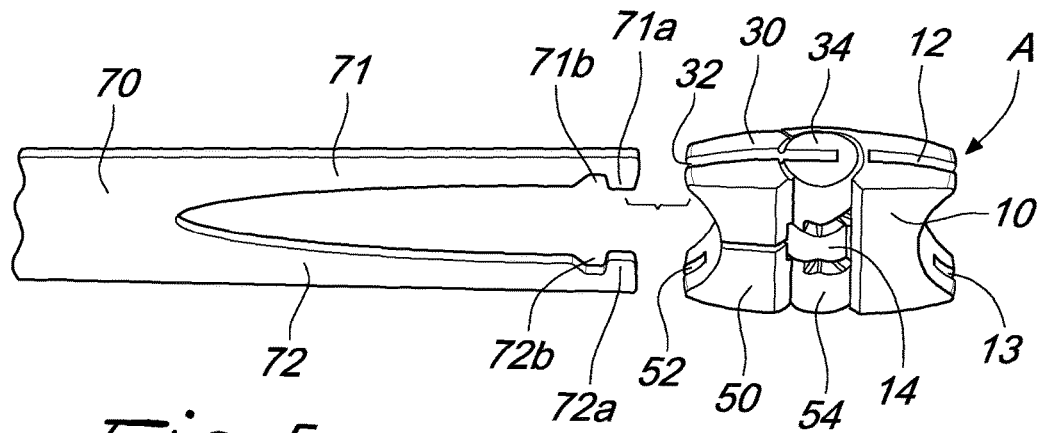
FIG. 5 is a perspective view of the hinge in FIG. 4, being joined to the hingeing end of a temple for eyeglasses.
Figure 6:
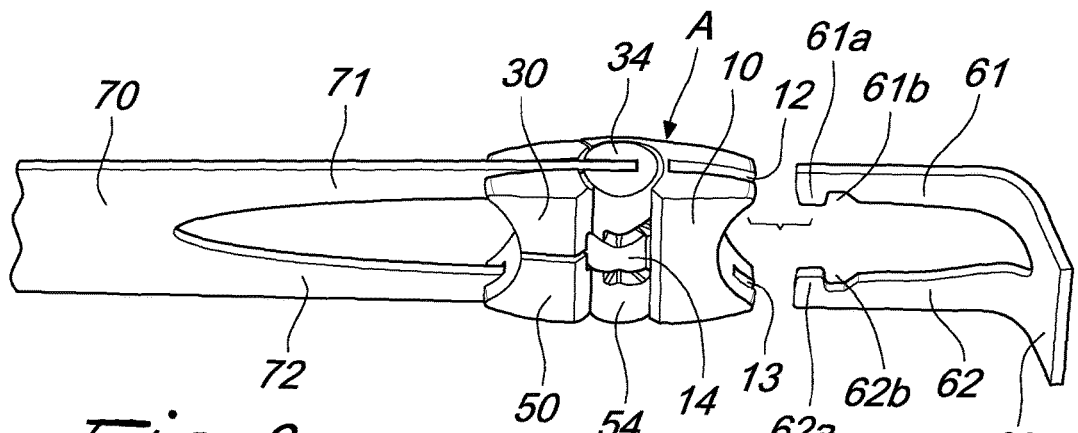
FIG. 6 is a perspective view of the hinge and of the temple in FIG. 5, now mutually associated and being joined to a lug or end piece of the front of an eyeglass frame.
Figure 7:
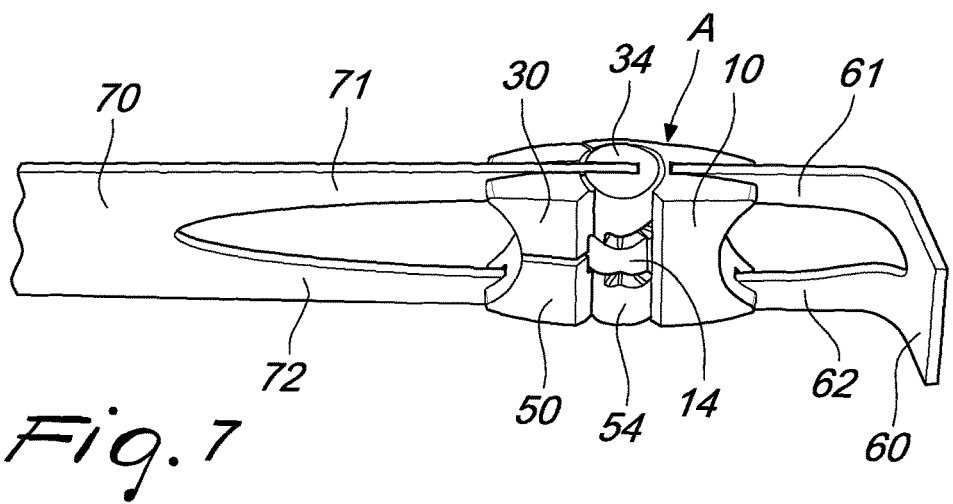
FIG. 7 is a perspective view of the hinge elements in FIG. 6, in the condition of their integral articulated join, showing the normal open position of the temple on the front of the eyeglass frame.
Figure 11:
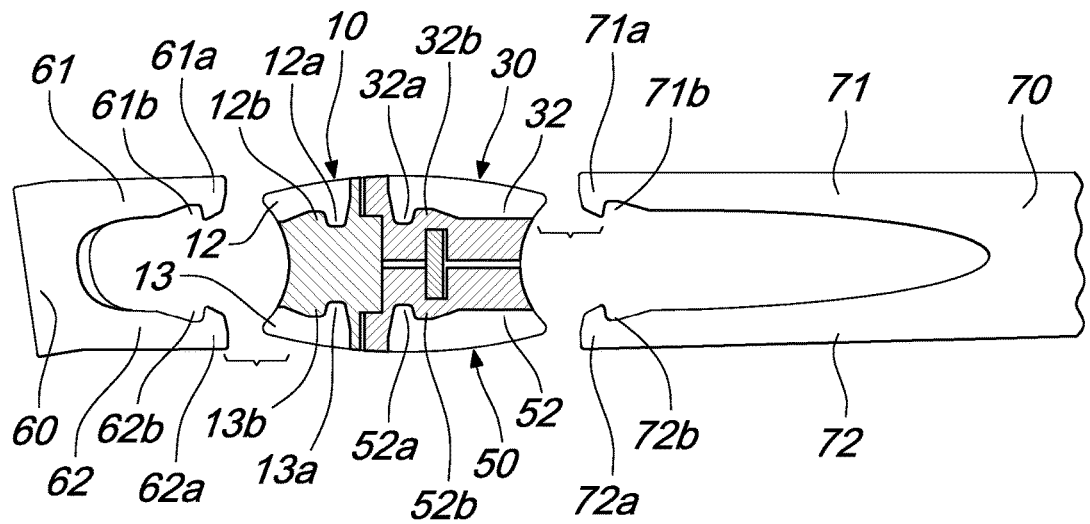
FIG. 11 is a longitudinal sectional view of the hinge block in FIG. 4, with adjacent ends of the temple and of the lug to be engaged with the hinge block.
Figure 12:
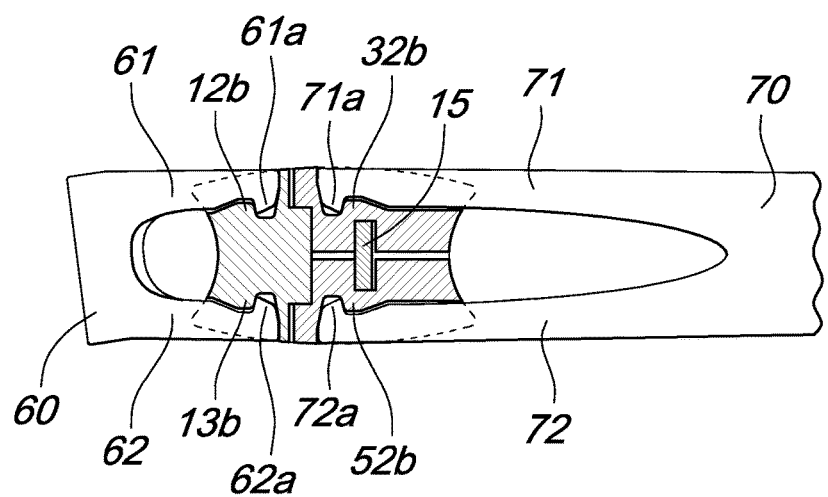
FIG. 12 is the same longitudinal sectional view as FIG. 11, with the ends of the temple and of the lug now hooked to the hinge block in FIG. 4, in accordance with the reversed perspective view of FIG. 7.

As mentioned above, FIG. 5 shows the hingeing end or side of a preferably metallic temple 70, to be associated with the outer eyelets 30, 50 of the hinge block A, just as FIG. 6 also shows a lug 60 or outer side or pieced of a front of an eyeglass frame, to be associated with the middle eyelet 10 of the hinge block A.

In more detail, the hingeing end of the temple 70 has a pair of tines 71, 72 with respective head hooks 71a, 72a preceded by notches 71b, 72b, having a thickness and dimensions that are adapted to be accommodated in the slits 32, 52 of the eyelets 30 and 50, as described hereinbelow.

Similarly, the hingeing end of the lug 60 has a pair of tines 61a, 62a with head hooks 61a, 62a preceded by a pair of notches 61b, 62b, having a thickness and dimensions that are adapted to be accommodated in the slits 12, 13 of the center eyelet 10 of the hinge block A.

With reference in particular to FIGS. 7, 8, 11 and 12, it is clear that the articulated join of the temple 70 to the lug or front 60 of an eyeglass frame is made possible by the interposition of the hinge block A, with the coupling of the tines 71, 72 of the temple 70 in the slits 32, 52 of the outer eyelets 30, 50, and with the coupling of the tines 61, 62 of the lug 60 in the slits 12 and 13 of the middle eyelet 10.

In more detail, after assembling the eyelets 10, 20 and 30, in accordance with the foregoing explanation and also shown for the purposes of non-limiting example in FIG. 4, the tines 71 and 72 of the temple 70 are aligned with the slits 32 (of the eyelet 30) and 52 (of the eyelet 50) of the hinge block A. With a slight pressure, the tines 71, 72 are pushed along the slits 32, 52, causing a slight splaying of the tines 71, 72, which enables their hooked ends 71*a*, 72*a* to overcome the respective abutment 32*b*, 52*b* of the slits 32, 52, thus ending up accommodated in the head cavities 32*a*, 52*a* of the respective outer eyelets 30, 50, where the tines 71, 72 react to the forced splaying and return to their normal condition, thus ensuring the stable joining of the temple 70 to the eyelets 30, 50 of the hinge block A.

Similarly, the tines 61, 62 of the lug 60 are then aligned with the slits 12, 13 of the center eyelet 10 of the hinge block A. With a slight pressure, the tines 61, 62 are pushed along the slits 12, 13, causing a slight splaying thereof that enables their hooked ends 61*a*, 62*a* to overcome the respective abutment 12*b*, 13*b* of the slits 12, 13, thus ending up accommodated in the head cavities 12*a*, 13*a* of the center eyelet 10, where the tines 61, 62 spring back from the splaying and ensure the stable joining of the lug 60 to the center eyelet 10 of the hinge A.

With reference to FIGS. 8, 9 and 10, it is clear that, assuming the lug 60 or end piece of a front of an eyeglass frame remains motionless, with respect to the hinge block A and specifically to its center eyelet 10 which remains integral with the lug 60, it is possible to exert a slight pressure inward on the temple 70, in order to produce a closing rotation thereof, during which the outer eyelets 30, 50 rotate and move away from the center eyelet 10, by virtue of the sliding of the respective inclined walls 21, 22 of the reciprocal cam surfaces 20, until such time as such sliding reaches its crest 23, indicatively when the temple 70 is positioned in the condition of unstable equilibrium shown in FIG. 9, at 45° with respect to the mutually perpendicular open and closed positions, shown respectively in FIG. 8 and in FIG. 10. In this unstable condition, we have the maximum splaying of the tines 71, 72, as shown in FIG. 9, while, if we continue applying the same slight pressure, the temple 70 clicks home to reach the closed condition in FIG. 10, in which the inclined surfaces 21, 22 of the respective cams 20 are brought to the lowered position 24, thus reducing to the minimum the splaying force of the tines 71, 72, which still ensure the stable join of the outer eyelets 30, 50 with the center eyelet 10, as well as a robust and detachable join of the temple 70 and of the lug 60 to the hinge block A.

Obviously, by inverting the pushing action on the temple 70, we also invert the sliding paths of the inclined walls 21, 22 of the respective radial cam surfaces 20 which, starting from the closed position shown in FIG. 10, make it possible to reach first the position of unstable equilibrium shown in FIG. 9, and then we have the opening click that brings the temple to the position shown in FIG. 8.

Thus an eyeglass frame is provided that is free from hingeing screws or pins and thus from the drawbacks of their application, as well as any other current problem associated with a stable articulated join of the hinged parts, in accordance with the set principal aim.

The present disclosure also eliminates the present need to apply cumbersome helical or leaf springs which, being reduced in size and thus of limited elastic capacity, always contribute to overdimensioning current elastic hinges, as well as negatively influencing their precarious robustness, in accordance with another of the set objects.

The independence of the outer eyelets 30, 50 and their join to the temple 70 by way of the slits 32, 52, as with the join of the center eyelet 10 to the lug 60 by way of the slits 12, 13, completely eliminate the necessity to resort to welding or to complex mechanical affixings of the hinge A to the temples 70 and to the lug 60, in accordance with another of the set objects.

The axial translational movement of the outer eyelets 30, 50 which determines the opening and closing click occurs by way of the sliding of the inclined walls 21, 22 of the various cams 20, without problems of erosion or wear of the exposed surfaces of the temples 70 or of the lugs 60, in accordance with another of the set objects.

As mentioned above, FIG. 13 is a first variation of embodiment of the hinge that has been described and illustrated up to now. According to this variation of embodiment, a center eyelet 10' has a side part 11' with an adjacent cylindrical part 14', with a gutter-like wall 15', with an axial hole 18' and with mutually opposite surfaces with cam heads 20', in accordance with the earlier description of the previous center eyelet 10, but its side body 11' differs from the shape structure of the corresponding side body 11 in that it does not have the slits 12, 13 and it is instead provided with a single, center slit 12' into which the open ends 61' and 62' of the lug 60' of the front of the eyeglass frame F interlock. The ends 61' and 62' are provided with respective head hooks 61*a*' and 62*a*' and with adjacent grooves 61*b*', 62*b*'.

Welded or in any case stably fixed on the inner side of the side body 11' is a nut or threaded seat 63 which is connected to the hole or slit 12' of the side part 11' of the eyelet 10'.

According to this variation of embodiment, the tines or open ends 61', 62' of the front of the eyeglass frame F are accommodated in the space 12' of the lug 10', so that their grooves 61*b*' and 62*b*' are arranged in axial alignment with the threaded hole 63 where the threaded 64 grub screw is screwed. With the screwing of the grub screw 64, its tip 64*a* is insinuated between the grooves 61*b*', 62*b*' causing a slight splaying thereof that brings the ends 61*a*', 62*a*' in abutment against the vertical edges of the slit 12'. In this manner, the front 17 is stably and detachably joined to its lug 11' and can be associated with the outer eyelets 30, 50 in order to still form a hinge A for an eyeglass frame, according to the earlier specification.

Obviously the side part 11' can be made angled, as shown for the purposes of non-limiting example in FIG. 13, or it can be shorter and straighter, indicatively as in FIG. 2, thus providing for associating its slit 12' with the ends 61' and 62', which will first be folded in order to be aligned with the temple 70 in open position.

Other variations of embodiment of the present hinge can obviously be carried out. By way of example, it is possible to provide hinges A with a single eyelet 30 to be associated with the temple 70, with consequent reduction of the number of cams 20 and with simplification of the shape of the fixed eyelet 10 as well, and it is possible to provide the end 11 of the eyelet 10 with adapted hooks or couplings for its direct application to lenses, when providing rimless eyeglasses.

These and other, similar modifications or adaptations are understood to be within the scope of the originality of the disclosure for which protection is sought.

The disclosures in Italian Patent Application No. BL2013A000008 from which this application claims priority are incorporated herein by reference.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A hinge with circular cam eyelets, for the elastic articulated joining of the temples to the front of an eyeglass frame, for the provision of which no welding is required of eyelets or of other joining parts to the respective end pieces of the front and of the temple, and the insertion is not required of articulation screws or pins, wherein it involves providing a hinge that is constituted by a pair of two independent outer eyelets, to be engaged with two tines provided at the hingeing end of the temple, and by a middle eyelet, to be engaged with two tines provided at the two side hingeing end pieces of the front of the eyeglass frame, said middle eyelet being provided with two coaxial cavities, with contoured bottom surfaces that define circular or radial cams, these surfaces being able to rotate and slide on corresponding and mutually opposite radial cam surfaces of the outer eyelets which, with the rotation of the temples with which they are associated, cause an axial translational movement of said outer eyelets, this translational movement being opposed elastically by the tines of the hingeing ends of the temples, thus determining the opening and closing click of said temples on the front of the eyeglass frame.

2. The hinge with circular cam eyelets according to claim 1, wherein the central block of a hinge, for the articulated joining of the temple to the front of an eyeglass frame, is constituted by a middle eyelet, which can be associated with the end pieces of a front or with a lug, and by a pair of independent outer eyelets and, which are associable with said middle eyelet and with the hingeing end of a temple of an eyeglass frame.

3. The hinge with circular cam eyelets according to claim 2, wherein a middle eyelet has a side body, which is provided with an upper slit thereof and a corresponding lower slit, both of which are provided with a respective end cavity and with a respective adjacent abutment, and also is provided with a cylindrical middle part that is integral with a curved wall, said wall being adapted to define two mutually opposite open cavities that are mutually connected by an axial hole.

4. The hinge with circular cam eyelets according to claim 3, wherein the mutually opposite open cavities have an opposing axial end face or rim of the cylinder which is contoured to define a radial or spatial cam, with inclined radial surfaces that are adapted to determine at least one crest and at least one trough, for each one of the two mutually opposite cams.

5. The hinge with circular cam eyelets according to claim 3, wherein a lug or end piece of the front has a pair of tines thereof which is preceded by a pair of notches, having a thickness and dimensions that are adapted to be accommodated in the upper and lower slits of the center eyelet of the hinge block.

6. The hinge with circular cam eyelets according to claim 2, wherein an independent eyelet, to be associated with the end of a temple, is constituted by a side body and by a cylindrical body, along which is defined a slit with a head cavity and with an adjacent abutment, while said cylindrical body has a cylindrical coaxial shank, arranged on the side thereof that is lower and opposite to the slit, and the lower part of said cylindrical body has a radial or spatial cam shape structure that corresponds to the cam of the middle eyelet and has similar dimensions and inclinations, with crests and with troughs.

7. The hinge with circular cam eyelets according to claim 6, wherein a lower outer eyelet is constituted by a side body and by a further cylindrical body, between which is defined a slit with a head cavity, and with an adjacent abutment, while said further cylindrical body is provided with a coaxial shank that is arranged on the side thereof that is upper and opposite to the slit, and the upper part of said further cylindrical body has a radial cam shape structure, with inclined walls, with crests and with troughs, which corresponds to the cam of the center ring and which has similar dimensions.

8. The hinge with circular cam eyelets according to claim 7, wherein the cylindrical body and the further cylindrical body of the outer eyelets are accommodatable in the open spaces of the center eyelet, with accommodation of their respective shanks in the axial hole of said center eyelet, in such a way that the cam surfaces of the central body interlock with the cam surfaces of the mutually opposite outer eyelets, thus determining an aligned arrangement thereof which can be made to rotate in a perpendicular arrangement.

9. The hinge with circular cam eyelets according to claim 7, wherein a metallic temple, to be associated with the outer eyelets of the hinge block, has a pair of tines with respective head hooks preceded by notches, having a thickness and dimensions that are adapted to be accommodated in the slits of said eyelets.

10. The hinge with circular cam eyelets according to claim 9, wherein, with a slight pressure on the temple, once associated with its eyelets, a sliding is caused between their inclined surfaces and the reciprocal cam surfaces of the middle eyelet, said sliding determining an axial translational movement of said eyelets, such translational movement making it possible to obtain an opening and closing click of the temple, by virtue of the pressure exerted by their tines on the outer eyelets during the axial translational movement.

11. The hinge with circular cam eyelets according to claim 1, wherein a center eyelet has a cylindrical part with a gutter-like wall, with an axial hole and with mutually opposite surfaces with cam heads, where a side body is provided with a slit into which slot open ends of a lug of the front of an eyeglass frame are inserted, said open ends being provided with respective head hooks and with adjacent dips, which can be locked in place, by way of pressure inside the space, by a grub screw screwed into a threaded seat that is integral with the lug.

* * * * *